US008761491B2

(12) United States Patent
Chen et al.

(10) Patent No.: US 8,761,491 B2
(45) Date of Patent: Jun. 24, 2014

(54) STEREO-MATCHING PROCESSOR USING BELIEF PROPAGATION (75) Inventors: Liang-Gee Chen, Tainan (TW);
Chung-Te Li, Tainan (TW);
Chao-Chung Cheng, Tainan (TW);
Chia-Kai Liang, Tainan (TW);
Yen-Chieh Lai, Tainan (TW);
Ling-Hsiu Huang, Tainan (TW)

(73) Assignees: Himax Technologies Limited, Tainan (TW); National Taiwan University, Taipei (TW)

( * ) Notice: Subject to any disclaimer, the term of this patent is extended or adjusted under 35 U.S.C. 154(b) by 161 days.

(21) Appl. No.: 13/118,526

(22) Filed: May 30, 2011

(65) Prior Publication Data
US 2011/0285701 A1 Nov. 24, 2011

Related U.S. Application Data (63) Continuation-in-part of application No. 12/367,032, filed on Feb. 6, 2009, now Pat. No. 8,249,369.

(51) Int. Cl.
*G06K 9/00* (2006.01)
(52) U.S. Cl.
USPC ........... 382/154; 382/277; 382/284; 345/419; 345/582
(58) Field of Classification Search
CPC ............... G06K 9/4638; G06T 7/0022; G06T 2207/20076; G06T 2207/20228; H04N 13/0271; H04N 2013/0081
USPC .......... 382/154, 227, 275, 284; 345/419, 582, 345/634, 637, 639
See application file for complete search history.

(56) References Cited

U.S. PATENT DOCUMENTS

| 7,502,521 | B2 * | 3/2009 | Sun et al. ...................... 382/254 |
| 7,599,547 | B2 * | 10/2009 | Sun et al. ...................... 382/154 |
| 7,599,574 | B2 * | 10/2009 | Mori ............................ 382/274 |
| 8,179,448 | B2 * | 5/2012 | Chen et al. ................. 348/222.1 |
| 8,249,369 | B2 * | 8/2012 | Chen et al. .................... 382/232 |

(Continued)

OTHER PUBLICATIONS

Felzenszwalb et al., "Efficient Belief Propagation for Early Vision", International Journal of Computer Vision 70(1), pp. 41-54,published 2006.*

(Continued)

*Primary Examiner* — Mekonen Bekele
(74) *Attorney, Agent, or Firm* — SU IP Consulting (57) ABSTRACT In accordance with at least some embodiments of the present disclosure, a processor for performing stereo matching of a first image and a second image is described. The processor may include a first pipeline stage configured to generate data costs associated with a first tile selected from the first image, wherein the data costs is generated based on pixels in the first tile and corresponding pixels in the second image. The processor may include a second pipeline stage configured to generate disparity values associated with the first tile and an outbound message from the first tile to one of neighboring tiles in the first image, wherein the disparity values and the outbound message are generated based on the data costs and inbound messages from the neighboring tiles to the first tile. The processor may further include a third pipeline stage configured to store the disparity values and the outbound message in a memory, wherein the outbound message is used by the second pipeline stage as one of the inbound messages during processing of a second tile selected from the first image.

15 Claims, 7 Drawing Sheets

(56) References Cited

U.S. PATENT DOCUMENTS

| | | | |
|---|---|---|---|
| 2009/0164192 A1* | 6/2009 | Yu | 703/13 |
| 2010/0135585 A1* | 6/2010 | Chen et al. | 382/227 |
| 2011/0081054 A1* | 4/2011 | Bell et al. | 382/128 |
| 2011/0081055 A1* | 4/2011 | Bell et al. | 382/128 |
| 2011/0249870 A1* | 10/2011 | Cheng et al. | 382/107 |

OTHER PUBLICATIONS

Richard Szeliski, "A Comparative Study of Energy Minimization Methods for Markov Random Fields with Smoothness-Based Priors" IEEE Transactions on Pattern Analysis and Machine Intelligence, vol. 30, No. 6, Jun. 2008, pp. 1068-1080.*

Chao-Chung Cheng, et al., "Architecture Design of Stereo Matching Using Belief Propagation," Circuits and Systems (ISCAS), Proceedings of 2010 IEEE International Symposium, pp. 4109-4112, May 30, 2010.

Yu-Ceng Tseng, "Low Memory Cost Block-Based Belief Propagation for Stereo Correspondence", IEEE, 2007, pp. 1415-1418.

He et al., "Parallel Processing for Fast Iterative Decoding of Orthogonal Convolutional Codes", IEEE Communications Letters, Sep. 2006, pp. 664-666, vol. 10, No. 9.

* cited by examiner

| | From Off Chip | | To Off Chip | On-Chip Reuse |
|---|---|---|---|---|
| LI | Yes | RO | Yes | No |
| DI | Yes | UO | Yes | No |
| UI | Yes | DO | Yes | No |
| RI | Yes | LO | Yes | No |

Table
(520)

| | From Off Chip | | To Off Chip | On-Chip Reuse |
|---|---|---|---|---|
| LI | No | RO | Yes | Yes |
| DI | Yes | UO | No | No |
| UI | No | DO | Yes | Yes |
| RI | Yes | LO | No | No |

Table
(530)

STEREO-MATCHING PROCESSOR USING BELIEF PROPAGATION

CROSS REFERENCE TO RELATED APPLICATION

The present application is a continuation-in-part of and claims priority to co-pending U.S. patent application having Ser. No. 12/367,032, filed Feb. 6, 2009, entitled "Method and Apparatus of Tile-Based Belief Propagation", which claims priority to a provisional application having Ser. No. 61/119,333, filed on Dec. 2, 2008. The disclosures of the forgoing applications are hereby incorporated by reference in their entireties, including any appendices or attachments thereof, for all purposes.

BACKGROUND OF THE DISCLOSURE

1. Field of the Disclosure

Embodiments of the present disclosure relate generally to display technologies and more specifically to the hardware architecture design of stereo matching using belief propagation.

2. Description of the Related Art

Unless otherwise indicated herein, the approaches described in this section are not prior art to the claims in this application and are not admitted to be prior art by inclusion in this section.

In computer vision or image processing, energy (or cost) minimization on a Markov Random Field (MRF) is commonly applied to the assigning of an optimal label to pixels of an image representation. Many algorithms have been proposed for finding the optimal label assignment as formulated in the energy minimization. Among the algorithms, belief propagation (BP) has become a popular technique for solving computer vision problems, such as stereo estimation and image de-noising. However, conventional belief propagation algorithms require large amounts of memory and bandwidth, therefore restricting straightforward hardware implementation.

SUMMARY

In accordance with one or more embodiments of the present disclosure, a processor for performing stereo matching of a first image and a second image may be present. The processor may be configured to include a first pipeline stage configured to generate data costs associated with a first tile selected from the first image, wherein the data costs are generated based on pixels in the first tile and corresponding pixels in the second image. The processor may include a second pipeline stage configured to generate disparity values associated with the first tile and an outbound message from the first tile to one of neighboring tiles in the first image, wherein the disparity values and the outbound message are generated based on the data costs and inbound messages from the neighboring tiles to the first tile. The processor may further include a third pipeline stage configured to store the disparity values and the outbound message in a memory, wherein the outbound message is used by the second pipeline stage as one of the inbound messages during processing of a second tile selected from the first image.

In accordance with other embodiments of the present disclosure, a system for processing a stereo image pair may be present. The system may be configured to include a depth map generator for generating a depth map based on a first image and a second image selected from the stereo image pair, wherein the depth map generator contains a stereo vision processor which generates disparity values by performing stereo-matching of the first image and the second image using belief propagation (BP), and the depth map generator generates the depth map based on the disparity values. The system may further include a multi-view image generator coupled with the depth map generator for generating a multi-view image based on the depth map, the first image and the second image.

In accordance with further embodiments of the present disclosure, a method for performing stereo matching of a first image and a second image using belief propagation (BP) may be present. The process may be configured for a first pipeline stage to generate a first set of data costs based on pixels in a first tile selected from the first image and corresponding pixels in the second image. The process may also be configured for a second pipeline stage to generate disparity values associated with the first tile and an outbound message from the first tile to one of neighboring tiles of the first tile in the first image, the disparity values and the outbound message being generated based on the first set of data costs and inbound messages from the neighboring tiles to the first tile. The process may be configured for a third pipeline stage to store the disparity values and the outbound message, wherein the outbound message is used by the second pipeline stage as one of the inbound messages during processing of a second tile selected from the first image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to hardware architecture to perform stereo matching of images using belief propagation.

Throughout the disclosure, a "pipeline" may refer to a set of data processing elements connected in series, so that the output of one processing element may be stored and used as the input of the next one. The pipeline may allow a task to be split into multiple sub-tasks, each of which may be executed by one of the aforementioned data processing elements. The "task" may correspond to one or more instructions. The data processing element, which may include dedicated hardware components, and a "pipeline stage" are used interchangeably in the disclosure. Multiple pipeline stages of a pipeline may be executed in parallel or in a time-sliced fashion.

Figure 1:
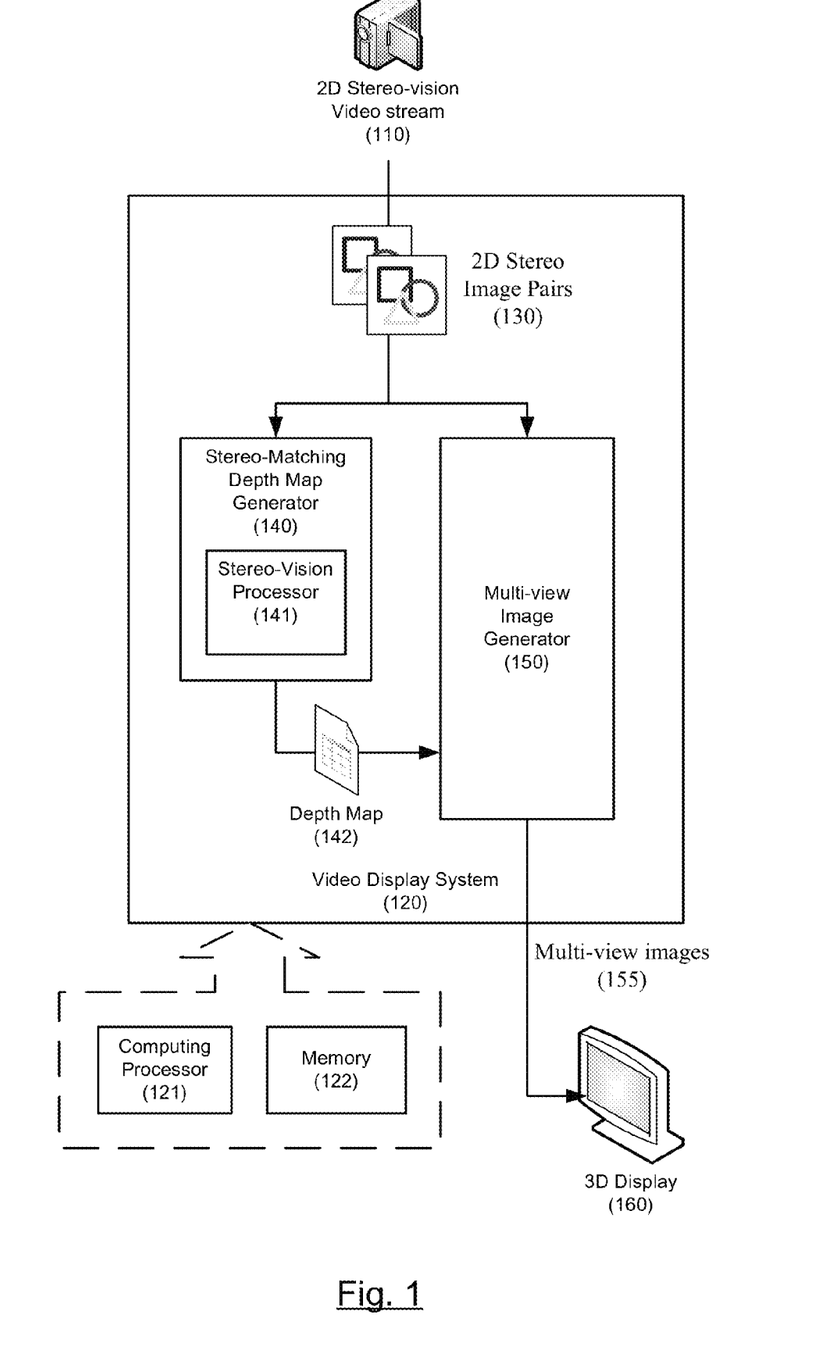
FIG. 1 shows a block diagram with illustrative embodiments of a system for performing stereo-matching using belief propagation.

FIG. 1 shows a block diagram with illustrative embodiments of a system for performing stereo matching using belief propagation. In FIG. 1, a video display system 120 may be configured to process 2D stereo-vision video stream 110, and generate a set of multi-view images 155 for displaying on a 3D display 160. The video display system 120 may be configured to include, without limitation, a stereo-matching depth map generator 140, a multi-view image generator 150, a computing processor 121, and/or a memory 122. The stereo-matching depth map generator 140 may include a stereo-vision processor 141 that processes a 2D stereo image pair 130 and generates a depth map 142 using stereo matching. The multi-view image generator 150 may then process the 2D stereo image pair 130 using the depth map 142, and generate a corresponding multi-view image 155.

In some embodiments, a 2D stereo-vision video stream 110 may be a video stream generated by a stereo-vision video capturing device. The stereo-vision video capturing device may contain two side-by-side cameras which simulate a human's left and right eyes. The 2D stereo-vision video stream 110 may contain a sequence of image pairs each of which may be referred to as a 2D stereo image pair 130. Therefore, each 2D stereo image pair 130 may contain a pair of images (e.g., a left image and a corresponding right image) obtained by the stereo-vision video capturing device.

In some embodiments, when recording a common scene, the cameras of the stereo-vision video capturing device may generate a pair of 2D stereo images having different perspectives. That is, the relative positions of an object in the left and right images of the 2D stereo image pair 130 may appear slightly shifted. The amount of shifts between the 2D stereo image pair 130 may be referred to as disparities. The disparities may be larger for objects in the 2D stereo image pair 130 that are closer to the cameras. Stereo matching operation is an operation to find, for each pixel in the left image, the corresponding pixel in the right image that represents the same point in space. In other words, stereo-matching operation is to detect the disparity for each pixel in the left (or right) image.

In some embodiments, stereo matching may be performed based on a global optimization framework. In this framework, the optimal solution to the stereo matching of a 2D stereo image pair 130 may be obtained by minimizing the user-specified energy function using belief propagation (BP). BP may be a powerful method to estimate the optimal hidden states from the observation in a graphical model. The observation may be the left or right image of the 2D stereo image pair 130. The hidden states may be the disparity values for the pixels in the 2D stereo image pair 130. A BP approach for stereo-matching may be suitable for real-time or streaming applications.

In some embodiments, the stereo-matching depth map generator 140 may contain a stereo-vision processor 141 to perform fast stereo-matching operations, and generate a set of disparity values corresponding to a specific 2D stereo image pair 130. The stereo-vision processor 141 may be a hardware processor that contains fully-parallel process elements (PE) implemented by Very Large Scale Integration (VLSI) circuitry. To further improve performance, the stereo-matching depth map generator 140 may adopt memory-efficient tile-based BP (TBP) algorithm to separate the 2D stereo image pair 130 into a set of tiles. The stereo-vision processor 141 may then utilize techniques such as pipelining, PE retiming, and/or boundary-message-forwarding-and-reusing to achieve high efficiency and high utilization, while consuming less bandwidth, chip area, and/or power usage. The details the stereo-matching depth map generator 140 and the stereo-vision processor 141 are further described below.

In some embodiments, the disparity values detected by the stereo-vision processor 141 may be correlated to the distances between the objects and the cameras in the 2D stereo image pair 130. Using triangulation calculation, the distance of the objects from the recording cameras (i.e., the depth values) may be derived based on the disparity values and/or the physical measurements of the two recording cameras. As a result, a depth map for the 2D stereo image pair 130 may be generated to store the depth values for pixels of the left or right image.

In some embodiments, after the stereo-matching depth map generator 140 generates a depth map 142 corresponding to a specific 2D stereo image pair 130, the multi-view image generator 150 may utilize depth image based rendering (DIBR) techniques to render the specific 2D stereo image pair 140 using the depth map 142, and generate a corresponding multi-view image 155. Thus, the performance of stereo matching depth map generator 140 may directly determine the speed, as well as the quality, of the generating of the depth map 142.

In some embodiments, the video display system 120 may utilize the computing processor 121 for performing some or all of the above operations. The computing processor 121 may be a microprocessor or any general or specific computing device that executes commands based on programmable instructions. In some embodiments, the computing processor 121 may utilize the memory 122 to execute the programmable instructions and store the intermediate processing results of the execution. The memory 122 may be in any form of random access memory (RAM), read-only memory (ROM), flash memory, conventional magnetic or optical disks, tape drives, or a combination of such devices.

In some embodiments, the multi-view images 155 generated from the 2D stereo-vision video stream 110 may be transmitted to a 3D display 160 as a video stream. The display 160 may be a 3D displaying device that is capable of displaying 3D multi-view images 155. The 3D display 160 may include, without limitation, a computer monitor, a device screen, a television, or a projector.

Figure 2:
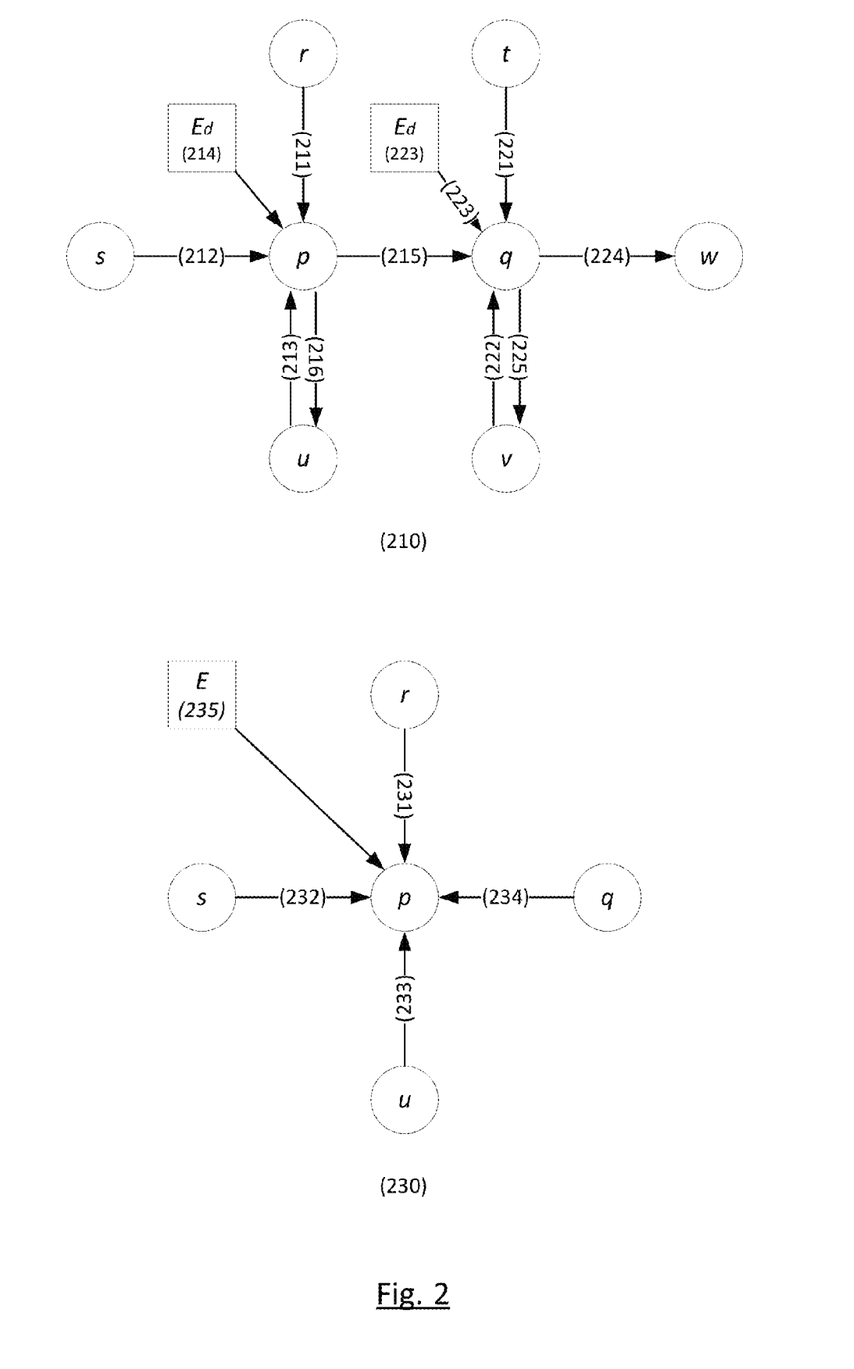
FIG. 2 shows illustrative scenarios of massage passing among multiple neighboring nodes during a stereo-matching operation using belief propagation.

FIG. 2 illustrates scenarios of message passing among multiple neighbouring nodes during a stereo-matching operation using belief propagation. In FIG. 2, scenario 210 illustrates the generating of outbound messages for a specific node at a specific iteration using messages from neighbour nodes at a previous iteration. Scenario 230 illustrates the determining of an optimal label for a node based on inbound messages from the neighbour nodes.

In some embodiments, an image may be represented by a graphic model having nodes that correspond to pixels or block of pixels in the image. A label may be assigned to each node in the graphic model to signify a local quantity of the state (or status) of the node. For example, the label of a node may be a disparity value associated with a pixel or a block of pixels. Thus, the optimal label assignment may be formulated as a problem of energy (cost) minimization on a Markov Random Field (MRF). There are two energy terms in this energy minimization, a data cost term $E_d$ and a smoothness term $E_s$. The data cost term $E_d$ corresponds to the penalties associated with the inconsistency between the labels and the observed pixel values, and the smoothness term $E_s$ favours the spatial coherence of the labels. Further, the data costs $E_d$ may be defined by the lightness or color similarity among the pixels from the left image and corresponding pixels (e.g., pixels at the same positions as, or in the spatial neighbourhoods of, the pixels from the left image) from the right image.

In some embodiments, stereo-matching a stereo image pair may be characterized as finding the optimal disparity values in a global optimization framework based on the following formula:

$$\{d_p\} = \mathop{\mathrm{argmin}}\left\{\sum_{p \in P} E_d(d_p) + \sum_{(p,q) \in G} E_s(d_p, d_q)\right\}, \quad \text{Formula 1}$$

where P refers to a set of all pixels, p refers to a specific node, G refers to a set of pixels that are neighbouring to node p, $E_d$ refers to the per pixel data cost function, $E_s$ refers to the smoothness cost function, $d_p$ refers to the optimal disparity value for the node p, and $\{d_p\}$ refers to the optimal disparity values for all nodes. The data cost function $E_d$ may encode the similarity between a pixel or a pixel block (associated with the node p) in the left image and corresponding pixels or pixel blocks in the right image. The smoothness cost function $E_s$ may encode the assumption that the disparity values between two neighbouring nodes should be smooth.

In some embodiments, a BP algorithm which utilizes iterative messages passing and calculates marginal distributions among the nodes of a graphic model may be suitable for finding an approximate solution to the above formula. Assuming the set of all disparity values (labels) is L, for each node p in an iteration t, an L-dimensional (number of labels in L) message $M_{pq}$ may be sent from node p to its neighbor nodes. Each message in iteration t may be constructed using the messages in the (t−1) iteration. When the messages converge or become stable, a local belief is calculated for each node, and the optimal disparity value is the extreme of the belief.

In some embodiments, the constructing of a message from node p to a neighboring node q at iteration t may be illustrated by the following formula:

$$M_{pq}^t(l_q) = \min_{l' \in L}\left\{E_s(l_q, l') + E_d(l') + \sum_{p' \in N_p \backslash q} M_{p'p}^{t-1}(l')\right\} \quad \text{Formula 2}$$

where Np is the set of the neighbors of p. Specifically, the node p first scans all labels l' and decides the one that gives the greatest supporting for assigning label l to node q based on the smoothness cost $E_s$ between l' and $l_q$, the self-judgment data cost $E_d$ of node p about being assigned with l', and the opinion message $M_{p'p}$ in iteration t−1 from neighbors.

In some embodiments, the BP algorithm processes through a graphic model in a raster scan order. That is, the nodes in the graphic model are processed in a left-right and top-down order, all the way from the top-left node to the bottom-right node. Alternatively, in a reverse-raster scan order, the nodes are processed in a right-left and bottom-up order, from the bottom-right node to the top-left node. The BP algorithm may process the graphic model with several iterations of the above message passing and label generating operations, by altering between the raster scan order and the inverse-raster scan order.

In FIG. 2, scenario 210 illustrates a node p selected from a graphic model being processed in a raster scan order. The node p has four neighboring nodes (up node r, left node s, down node u and right node q). Similarly, node q has four neighboring nodes (up node t, left node p, down node v, and right node w).

In some embodiments, to construct an outbound message 215 from p to q, the inbound messages 211, 212, and 213, which are from nodes r, s, and u respectively, are loaded (the inbound message from q to p are not loaded). The inbound messages 211, 212 and 213 are combined with the data cost $E_d$ 214 and smoothness cost for the node p, in order to generate an outbound message 215 from p to q. Similarly, the outbound message 224 from q to w may be generated based on the inbound messages 221, 215 and 222, as well as the data cost $E_d$ 215 for the node q. In some embodiments, to improve the performance of the BP calculation, the outbound message 215 generated during the processing of node p may be supplied to the processing of node q for calculating of the outbound message 224

In some embodiments, the above calculation also generates a down-outbound message 216 from node p to node u, at the same time as the generating of the right-outbound message 215. Thus, when processing the graphic model in a raster scan order, the messages are passed along the rows, then along the columns. During an inverse-raster scan order, the up-outbound message from node p to r, and the left-outbound message from node p to s are generated, similar to the generating of the right-outbound message 215 and the down-outbound message 216 during processing in raster scan order.

In some embodiments, after all the nodes are processed in the raster/inverse-raster scan order for one or more iterations, the messages and the labels among the nodes become stable. In this case, the optimal label $l_p$ for the node p may be determined based on the following formula:

$$l_p = \mathop{\mathrm{argmin}}_{l \in L}\left\{E_d(l) + \sum_{p' \in N_p} M_{p'p}^K(l)\right\} \quad \text{Formula 3}$$

In other words, after multiple iterations of the above operations, the node p may collect all messages from the neighbouring nodes in order to decide the optimal label for itself. Thus, the optimal label for node p may be deemed a disparity value. In scenario 240's example, to determine the optimal label for node p, inbound messages 231, 232, 233, 234, which are from nodes r, s, u, and q respectively, are used with the data cost $E_d$ (235) based on the above formula.

In some embodiments, to further improve the performance, and reduce the costs of, a BP operation, a tile-based belief propagation (TBP) algorithm may be utilized. Instead of passing messages at pixel level, the TBP splits the image into many non-overlapping N×N (N>1) tiles, and maintains the messages in-between the tiles in the memory. By processing the tiles sequentially in a raster and inverse-raster scan order for multiple iterations (outer iterations), the TBP generates results similar to those by the original BP, but takes less memory and bandwidth. The TBP algorithm may include processing the pixels within a tile for multiple iterations (inner iterations) and passing messages on a pixel-level. In comparison, during outer iterations, the messages are passed on a tile-level. In some embodiments, utilizing a tile size of 5 pixels×5 pixels, with 2 or 3 inner iterations, the TBP approach may generate disparity values that have sufficient accuracy without taking many computations. The details of reducing redundancy messages and repetitive temporary variables during the TBP computations are further described below.

Figure 3:
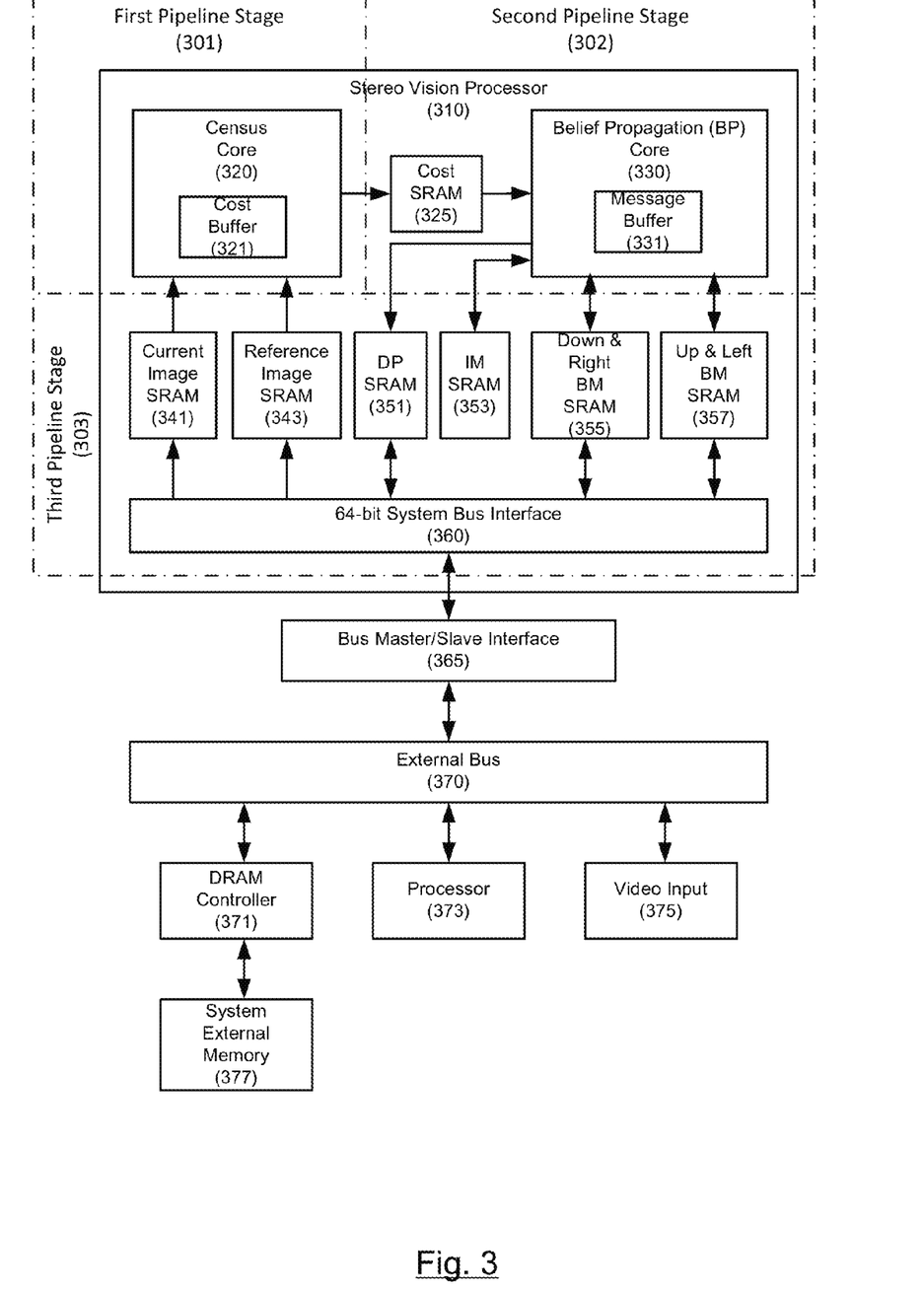
FIG. 3 shows illustrative embodiments of a stereo vision processor for generating disparity values and outbound messages during stereo-matching operation using belief propagation.

FIG. 3 shows illustrative embodiments of a stereo vision processor for generating disparity values and outbound messages during stereo-matching operation using belief propagation. In FIG. 3, a stereo vision processor 310 (similar to the stereo vision processor 141 of FIG. 1) may contain a census core 320 and a belief propagation (BP) core 330. The stereo vision processor 310 may also contain a cost static random-access memory (SRAM) 325, a current image SRAM 341, a reference image SRAM 343, a disparity (DP) SRAM 351, an internal message (IM) SRAM 353, a down & right boundary message (BM) SRAM 355, an up & left boundary message (BM) SRAM 357. In some embodiments, the above SRAMs may be implemented with a ping-pong mechanism for fast data load and retrieval.

In some embodiments, the stereo vision processor 310 may contain a 64-bit system bus interface 360 that allows the stereo vision processor 310 to be connected with the external bus 370 via a bus master/slave interface 365. Thus, the stereo vision processor 310 may be able to interact with external system components such as a processor 373, a video input 375, and a system external memory 377 via a DRAM controller 371.

In some embodiments, the architecture of the stereo vision processor 310 may support three key features. Firstly, the stereo vision processor 310 may be implemented with a three-stage pipeline to improve computation efficiency. Secondly, the BP core 330 may contain a fast message-generating pipeline process element (PE) to achieve high utilization. Thirdly, the boundary messages generated during the stereo matching operations may be efficiently reused.

In some embodiments, the stereo vision processor 310 may support a pipelined architecture to increase throughput for the processor. A stereo-matching task using BP may be split into several sub-tasks: a first sub-task for determining data costs for a tile selected from an image; a second sub-task for determining disparity values and outbound messages based on inbound messages and data costs; and a third sub-task for storing and loading data costs and various inbound and outbound messages.

In some embodiments, a three-stage pipeline supported by the stereo vision processor 310 may be configured to process the aforementioned multiple sub-tasks. A pipeline cycle may refer to a number of clock cycles required to complete the slowest pipeline stage in a pipeline. Therefore, a pipeline cycle may include one or more clock cycles. Assuming it takes one pipeline cycle for a pipeline stage to finish performing one sub-task. In a first pipeline cycle, the first sub-task of a first task may be performed in the first pipeline stage. In a second pipeline cycle, after having completed performing the first sub-task of the first task, the first pipeline stage may start to perform the first sub-task of a second task, while the second sub-task of the first task may be performed in parallel in the second pipeline stage. In a third pipeline cycle, the first sub-task of a third task may be performed in the first pipeline stage, while the second sub-task for the second task may be performed in the second pipeline stage, and the third sub-task section of the first task may be performed in the third pipeline stage.

In some embodiments, the stereo vision processor 310 may be configured to contain a first pipeline stage 301 to load pixel values of a stereo image pair, and to generate data costs based on the loaded pixel values. The second pipeline stage 302 of the stereo vision processor 310 may perform BP calculation to generate disparity values and outbound messages. The third pipeline stage 303 of the stereo vision processor 310 may store the generated outbound messages and the disparity values to memory, and load additional data in preparation for a next round of pipeline operations. In some embodiments, since the first pipeline stage 301 and the third pipeline stage 303 do not depend on each other, the first pipeline stage 301 and the third pipeline stage 303 may share some I/O cycles. For example, the third pipeline stage 303 may load a new tile, which to be processed by the first pipeline stage 301 in the next round of pipeline operation, into the current image SRAM 341, in parallel with the first pipeline stage 301 performing its operation. The first pipeline stage 301 may contain a census core 320 configured to generate data costs. The second pipeline stage 301 may contain a BP core 330 configured to perform the message construction and disparity decision operations. The operations that occur in the third pipeline stage 303 may involve various SRAMs load and unload, as well as the associated bus interfacing.

In some embodiments, a stereo-matching depth map generator may select the left image from a stereo image pair as a current image, and the right image as a reference image. The stereo-matching depth map generator may split the current image into non-overlapping tiles. The stereo vision processor 310 may instruct the third pipeline stage 303 to load, from the system external memory 377, one of the tiles (hereinafter "a first tile") to the current image SRAM 341, and the reference image into the reference image SRAM 343. The stereo vision processor 310 may then instruct the first pipeline stage 301 to perform stereo-matching based on the tile. The census core 320 in the first pipeline stage 301 may access the first tile in the current image SRAM 341 and compare the pixels values of the first tile with corresponding pixel values of the reference image that is stored in the reference image SRAM 343.

After the pixel values are loaded into the SRAM 341 and SRAM 343, the census core 320 may perform census transform to generate data costs for the pixels in the tile. In some embodiments, assuming the first tile from the left image and a corresponding tile from the right image contain 3×3 pixels and look like the following:

$$\begin{vmatrix} 20 & 5 & 80 \\ 30 & 12 & 50 \\ 0 & 100 & 5 \end{vmatrix}$$

$$\begin{vmatrix} 40 & 10 & 90 \\ 55 & 60 & 70 \\ 11 & 22 & 33 \end{vmatrix}$$

During census transformation, the pixel values within each tile are compared with each tile's own center pixel. When the comparison result is larger than 0, a value 1 is assigned, and when the comparison result is smaller or equal to 0, a value 0 is assigned. After comparison, the above two tiles may look like the following:

$$\begin{vmatrix} 1 & 0 & 1 \\ 1 & 0 & 1 \\ 0 & 1 & 0 \end{vmatrix}$$

$$\begin{vmatrix} 0 & 0 & 1 \\ 0 & 0 & 1 \\ 0 & 0 & 0 \end{vmatrix}$$

Afterward, the census transformation calculates a Hamming distance between these two vectors. The Hamming distance may be deemed a difference measurement between the above two tiles. In some embodiments, the smaller the Hamming distance, the higher the similarities between these two tiles of pixels. Also, census transform is generally robust to radiometric distortions and noises.

In some embodiments, after the census core 320 finishes the generation of the data costs for the pixels of the first tile in a first pipeline cycle, the data costs may be stored in the cost SRAM 325. In a second pipeline cycle subsequent to the first pipeline cycle, the second pipeline stage may continue the stereo-matching operation on the first tile, while the first pipeline stage may load a second tile subsequent to the first tile into the current image SRAM 341, so that the census core 320 may calculate data costs for the second tile. In the second pipeline cycle, the BP core 320 may load the inbound messages from the neighboring tiles relative to the first tile via the down & right BM SRAM 355 and/or the Up & left BM SRAM 357. If the inbound messages are not in the SRAM 355 or SRAM 357, the stereo vision processor 310 may load them from the external memory 377 via the 64-bit system bus interface 360.

In some embodiments, the BP core 330 may generate disparity values for the pixels of the first tile, and generate an outbound message based on the inbound messages and the data costs that are loaded from the cost SRAM 325. For example, in a raster scan order, the BP core 330 may load an up-inbound message, a left-inbound message, a down-inbound message, and generate a right-outbound message and/or a down-outbound message. Similarly, when the stereo-matching depth map generator processes the tiles in an inverse-raster scan order, the stereo vision processor 310 may generate up-outbound and left-outbound messages based on the data costs and the inbound messages. During operation, the BP core 330 may also generate messages that are internal to the tile, and passed among the pixels within the tile. The internal messages may be stored in the message buffer 331 inside of the BP core 330, as well as the IM SRAM 353.

In some embodiments, the third pipeline stage may store the right-outbound message and the down-outbound message in the down & right BM SRAM 355, and store the generated disparity values in the DP SRAM 351. In some embodiments, the information stored in the DP SRAM 351 and the down & right BM SRAM 355 may be further stored to the system external memory 377. Similarly, when the stereo-matching depth map generator processes the tiles in an inverse-raster scan order, the generated up and left outbound messages may be stored in the up & left BM SRAM 357.

In some embodiments, the census core 320 and the BP core 330 may be implemented to operate in parallel, and their degrees of parallelism may be balanced such that the whole stereo vision processor 310 may work at a high utilization rate. The number of processing cycles required for the second pipeline stage may be changed by adjusting the number of inner iterations (inner tile iterations) to generate disparity values and/or messages internal to a tile. Inner iterations may refer to the iterations of operations conducted for messages passing, data costs and disparity values generating within a specific tile. In other words, to balance the cycles between the first pipeline stage and the second pipeline stage, the degrees of parallelism of the census core 310 may be designed with respect to the inner iteration number and the degrees of parallelism of the BP Core 320.

For example, assuming the memory access in the first pipeline stage takes a fixed amount of cycles (e.g., 440 cycles), and the second pipeline stage may be depended on the number of inner iterations #inner. When there are 16×16 number of pixels in a tile, parallelism-degree of the census core 310 ($P_1$) and the parallelism-degree of the BP Core 310 ($P_2$) should be designed based on the following formula:

$$\frac{256 \times\ \underset{\#pixel}{\ } \underset{\#disparity}{64}}{P_1} + 440 \cong \frac{\left(256 \times\ \underset{\#pixel}{\ } \underset{\#disparity}{64} \times\ \underset{\#direction}{4} \times \#inner\right)}{P_2} \quad \text{Formula 4}$$

where #pixel may refer to a number of pixels in the tile, #disparity may refer to a number of disparity values to be generated, and #direction may refer to a number of outer iterations.

Figure 4:
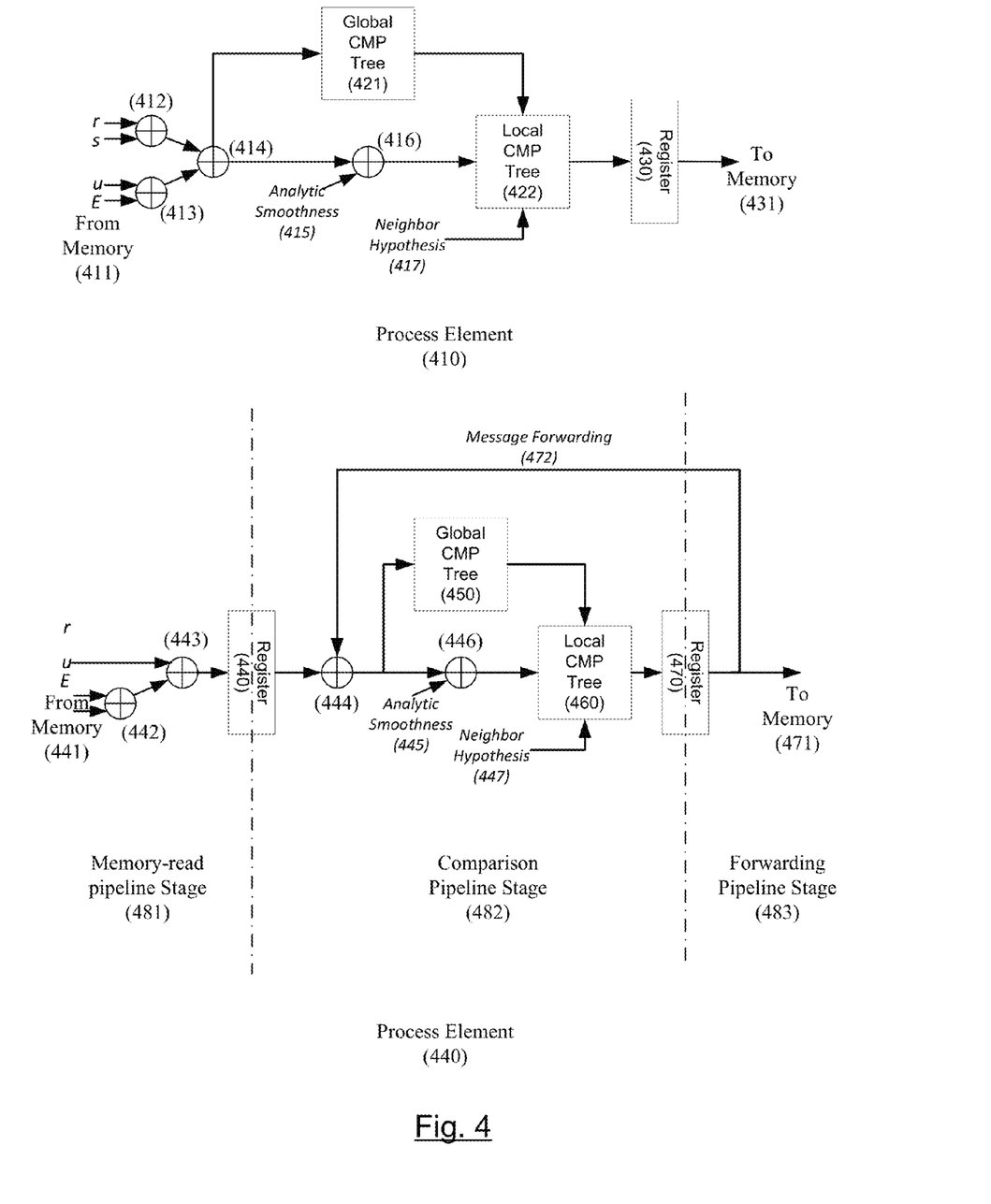
FIG. 4 shows illustrative embodiments of a process element (PE) in a BP core for fast generating of outbound messages.

FIG. 4 shows illustrative embodiments of a process element (PE) in a BP core for fast generating of outbound messages. In FIG. 4, a process element 410 in the BP core may first load from memory 411 an up-inbound message r, a left-inbound message s, a down-inbound message u, and a data cost E for a node to be processed by the process element 410. The loaded information may be stored in registers that are not shown in the process element 410. Afterward, the three ADD modules 412, 413 and 414 may perform the first set of operations, and send the intermediate result to a comparison unit, which includes an ADD module 416, a global comparison tree 421, and a local comparison tree 422. The comparison unit may use analytic smoothness information 445, which is predefined based on disparity values among node p and its neighboring nodes, and neighbor hypothesis 447, which are generated based on the smoothness information 445 and the disparity values, in order to generate an outbound message (e.g., the right-outbound message from p to q). The generated outbound message may first be stored in register 430, and subsequently be stored to external memory 431.

In some embodiments, the critical path for the process element 410 may include a memory access 411, the three ADD modules 412, 413, and 414, and the comparison unit. Further the outbound message may not be computed unless all the inbound messages toward p (from r, s, and u) are computed and loaded from memory 441.

In some embodiments, comparing to the process element 410, the process element 440 may be more efficient for parallel processing during outbound message construction. The process element 440, which may also be implemented in the BP core, uses parallel adder arrays and comparator trees to achieve high parallelism, that is, one stream for each message construction. By properly forwarding and pipelining, the overall latency that is present in the process element 410 may be reduced in the process element 440. Specifically, the process element 440 may be implemented with a message-generating pipeline to split the adder modules and the comparison unit into multiple pipeline stages. And the message dependent from the previous computation in the last pipeline stage may be forwarded to the previous pipeline stage.

In some embodiments, the PE 440 may be implemented by a three-stage message-generating pipeline having a memory-read pipeline stage 481, a comparison pipeline stage 482, and a forwarding pipeline stage 483. Because only one of three inbound messages (e.g., the left-inbound message) depends on the previous operation, the addition operation involving static messages may be moved to the memory-read pipeline stage 481, thereby reducing the critical path to the loop bound. In the memory-read pipeline stage 481, the two inbound messages that do not depend on the previous operation (e.g., the up-inbound message from r, and the bottom-inbound message from u) may be loaded from memory 441 and calculated by the ADD modules 442 and 443 with a data cost E. The intermediate result may be stored in the register 440.

In the comparison pipeline stage 482, the intermediate result may be loaded from the register 440, and calculated with a third inbound message that is forwarded from the forwarding pipeline stage 483. The result may be transmitted to the comparison unit, which contains an ADD module 446, a global CMP tree 450, and a local CMP tree 460. The outbound message generated by the comparison unit may be stored in the register 470.

In the forwarding pipeline stage 483, the outbound message may be stored to memory 471, and be forwarded via forward path 472 to the comparison pipeline stage 482. Thus, the outbound message may immediately be available for subsequent operations as soon as the outbound message is generated. In this way, the critical path of the PE 440 may include one ADD module 444 and a comparison unit, and the PE 440 can run at a faster speed. The loop bound value can be further reduced by parallel processing of multiple data-independent nodes.

Figure 5:
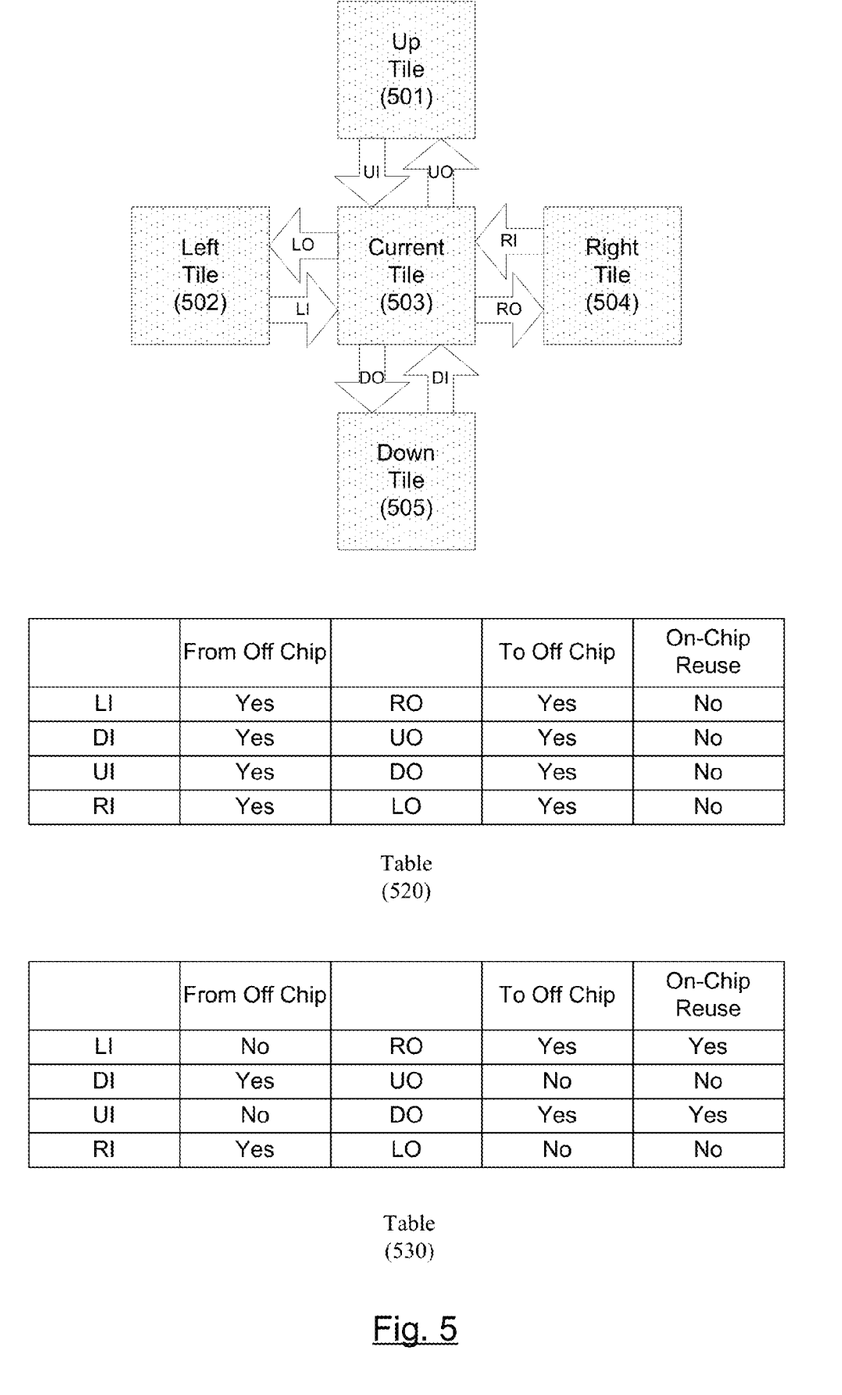
FIG. 5 shows illustrative embodiments of boundary message reuse.

FIG. 5 shows illustrative embodiments of boundary message reuse. The TBP algorithm reduces memory bandwidth costs by keep the boundary messages between a current tile and the neighboring tiles, without maintaining the messages that are transmitted among the pixels within the tile. In some embodiments, the memory bandwidth may be further reduced by reusing the boundary messages in-between the tiles, based on the characteristics of the raster/inverse-raster scan order.

In FIG. 5, a current tile 503 may have four neighboring tiles: an up-neighboring tile 501, a left-neighboring tile 502, a down-neighboring tile 505 and a right-neighboring tile 504. During a raster scan order BP processing, up-inbound message (UI), left-inbound message (LI), and down-inbound message (DI) are passed to the current tile 503 in order to generate the right-outbound message (RO) and the down-outbound message (DO). During an inverse-raster scan order BP processing, the UI, right-inbound message (RI), and DI are passed to the current tile 503 for the generating of the left-outbound message (LO) and the up-outbound message (UO).

In table 520 of FIG. 5, when no boundary messages are reused, each of the inbound messages may be read from memory external to the stereo vision processor (i.e., "from off chip"), and each of the outbound messages may be write to the external memory (i.e., "to off chip"), regardless of whether they will be used subsequently. However, when processing the tiles in a raster scan order, the RO from the current tile 503 may be reused as the LI for the right-neighboring tile 504 when the right-neighboring tile 504 is being processed. And the DO from the current tile 503 may be reused as the UI for the down-neighboring tile 505 when the down-neighboring tile 505 is being processed.

In table 530, when the RO is stored in the down-and-right BM SRAM of the stereo vision processor (i.e., "on-chip reuse"), loading the LI for the right-neighboring tile 504 from off-chip external memory may no longer be necessary. Rather, the stereo vision processor may directly access the down-and-right BM SRAM and retrieve the previously stored RO as the LI for the subsequent BP operation of the right-neighboring tile 504. Similarly, the stereo vision processor may store the DO in the down-and-right BM SRAM, and subsequently reuse the DO as UI when processing the down-neighboring tile 505.

Moreover, the tiles may be interleave-scanned (the altering of the raster and inverse-raster scan orders) for multiple outer iterations. In a raster scan order, the UO and LO may not be needed. In the inverse-raster scan order, the UO and LO are re-computed at each tile. Therefore, without affecting the BP algorithm, the groups UO and LO may be discarded in the raster scan order, and the groups RO and DO may be discarded in the inverse-raster scan order. Combining the above two bandwidth-reduction techniques, the memory and bandwidth required for maintaining boundary messages may greatly be reduced.

Figure 6:
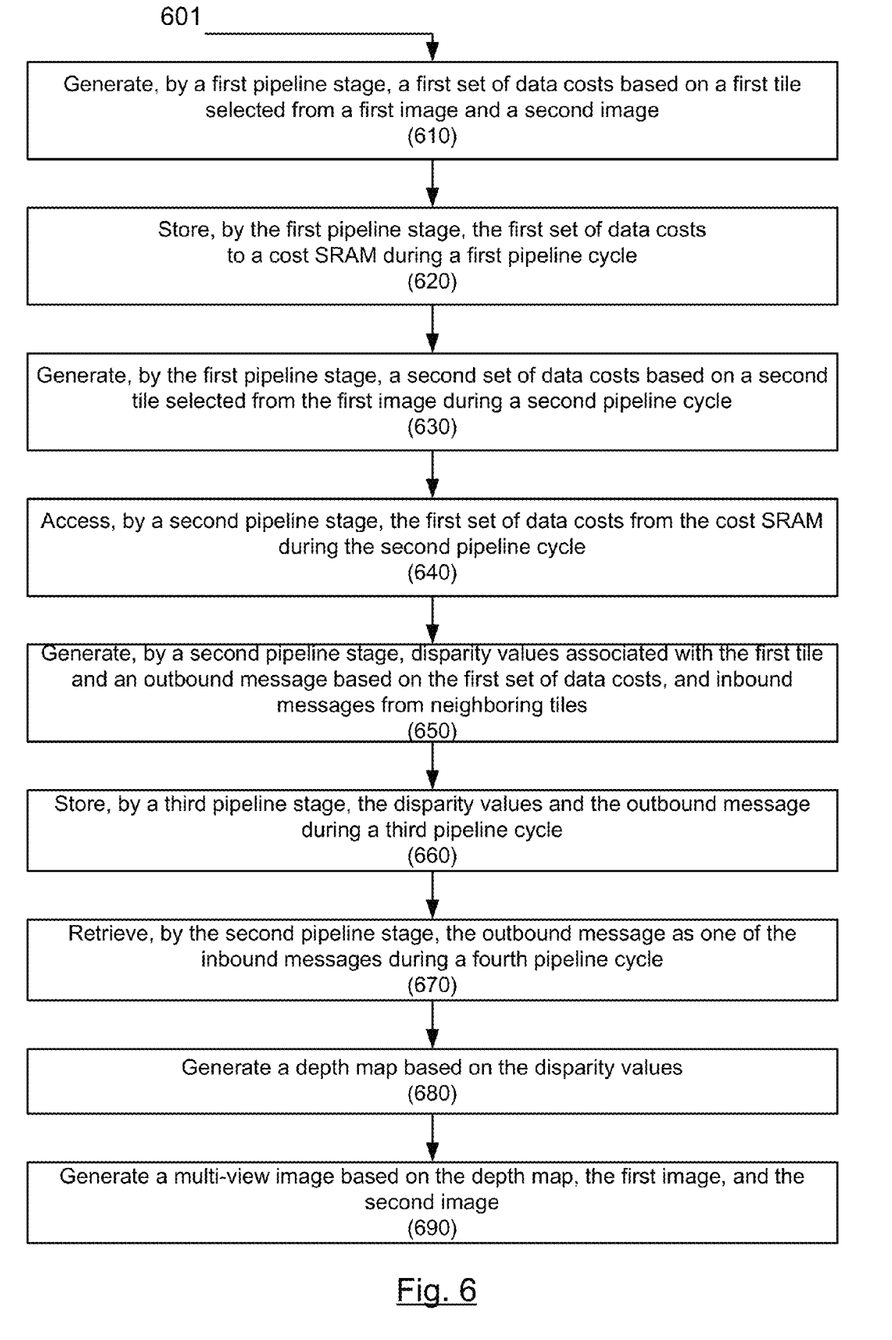
FIG. 6 shows a flow diagram of an illustrative embodiment of a process for performing stereo-matching using a pipelined architecture.

FIG. 6 shows a flow diagram of an illustrative embodiment of a process 601 for performing stereo-matching using a pipelined architecture. The process 601 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 610, a stereo vision processor may be implemented with a three-stage pipeline for performing stereo-matching using belief propagation. The stereo vision processor may process a first image and a second image selected from a stereo image pair. The first image may be split into multiple non-overlapping tiles. In some embodiments, a first pipeline stage of the stereo vision processor may retrieve a first tile from the tiles associated with the first image, and the second image from on-chip SRAMs in the stereo vision processor. The first pipeline stage may generate a first set of data costs by performing BP-related operations based on pixels in the first tile and corresponding pixels in the second image.

At block 620, the first pipeline stage may store the generated first set of data costs that are associated with the first tile to an on-chip cost SRAM in the stereo vision processor. In some embodiments, the first pipeline stage may contain a census core for performing the operations of block 610 and block 620 during a first pipeline cycle.

At block 630, the first pipeline stage may retrieve a second tile from the tiles associated with the first image, and generate a second set of data costs for the second tile based on pixels in the second tile and corresponding pixels in the second image.

The first pipeline stage may perform the block 630 operations during a second pipeline cycle which is subsequent to the first pipeline cycle.

At block 640, a second pipeline stage of the stereo vision processor may access the cost SRAM to retrieve the first set of data costs during the second pipeline cycle. Thus, the first pipeline stage may perform the operations of the block 630 in parallel with the second pipeline stage in performing its respective operations during the second pipeline cycle.

At block 650, the second pipeline stage may generate a set of disparity values associated with the first tile based on the first set of data costs and inbound messages from neighboring tiles of the first tile to the first tile. In some embodiments, the disparity values are generated based on formula 3 described above. Further, the second pipeline stage may generate an outbound message from the first tile to a neighboring tile. In a raster scan order, the neighboring tile may be the right-neighboring tile of the first tile. In an inverse-raster scan order, the neighboring tile may be the left-neighboring tile of the first tile. The outbound message may also be generated based on the first set of data costs and some of the inbound messages from the neighboring tiles of the first tile. For example, when the outbound message is a right-outbound message, then the right-inbound message from the right-neighboring tile of the first tile may not be used. When the outbound message is a left-outbound message, then the left-inbound message from the left-neighboring tile of the first tile may not be needed. The second pipeline stage may perform the above operations of the block 650 during the second pipeline cycle.

At block 660, a third pipeline stage of the stereo vision processor may store the disparity values and the outbound message to on-chip SRAMs or external memory. The third pipeline stage may also perform additional data loading activities, such as loading a second tile of the first image, which is next-in-line to the first tile for a specific scan order of processing, from external memory into the current image SRAM. The stereo vision process may use the outbound message during subsequent BP operations on different tiles. In some embodiments, the third pipeline stage may perform the operations of the block 660 during a third pipeline cycle that is subsequent to the first and the second pipeline cycle. Further, the third pipeline stage may load from external memory one or more tiles from the first image to a current image SRAM, and the second image to the reference image SRAM, in-parallel to the first pipeline stage during its operations.

At block 670, in addition to the operations of the block 650, the second pipeline stage may further retrieve from the on-chip SRAM or external memory the outbound message as one of the inbound messages for processing the second tile during a fourth pipeline cycle. In some embodiments, the fourth pipeline cycle may be subsequent to the third pipeline cycle. In this case, the second pipeline stage, which may be processing the second tile during the third pipeline cycle, may wait till the outbound message becomes available in the on-chip SRAM during the fourth pipeline cycle. Alternatively, the third pipeline cycle and the fourth pipeline cycle are the same. In this case, the outbound message becomes available in the on-chip SRAM during the third pipeline cycle, so that the second pipeline stage may access the outbound message as one of the inbound messages. In raster scan order, the outbound message may be a right-outbound message used as a left-inbound message, or a down-outbound message used as an up-inbound message. In inverse-raster scan order, the outbound message may be a left-outbound message or an up-outbound message used as a right-inbound message or a down-inbound message respectively during the processing of the second tile.

At block 680, the stereo-matching depth map generator may generate a depth map based on the disparity values. At block 690, a multi-view image generator may utilize the depth map to convert the first image and the second image into a multi-view image viewable on a 3D display.

Figure 7:
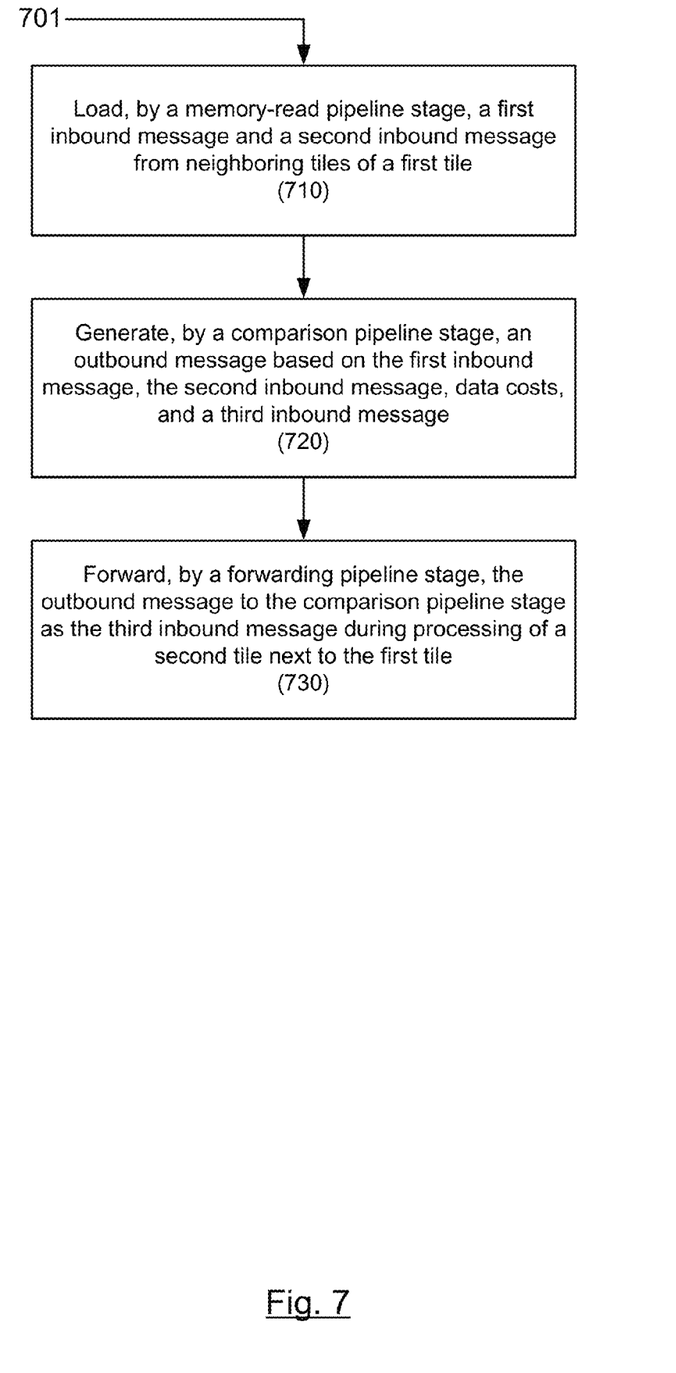
FIG. 7 shows a flow diagram of an illustrative embodiment of a process for improving outbound message generation using a message-forwarding pipeline, all in accordance with at least some embodiments of the present disclosure.

FIG. 7 shows a flow diagram of an illustrative embodiment of a process 701 for improving outbound message generation using a message-forwarding pipeline. The process 701 set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 7 may be practiced in various implementations.

In some embodiments, the BP core of a stereo vision chip may implement a three-stage pipeline for fast generating of outbound message, similar to the operations performed at block 650 of FIG. 6. At block 710, assuming the BP core is processing a first tile, a memory-read pipeline stage of the BP core may load a first inbound message and a second inbound message from neighbouring tiles of the first tile. The first inbound message and the second inbound message may be an up-inbound message and a down-inbound message respectively. The memory-read pipeline stage may further load a set of data costs associated with the first tile from an on-chip cost SRAM.

At block 720, a comparison pipeline stage of the BP core may generate an outbound message based on the first inbound message, the second inbound message, the set of data costs, and a third inbound message.

At block 730, a forwarding pipeline stage of the BP core may forward the outbound message to the comparison pipeline stage as the third inbound message. In other words, when the forwarding pipeline stage is perform block 730 at a specific pipeline cycle, the comparison pipeline stage may be processing a second tile next to the first tile. The outbound message, which may be a right-outbound or a down-outbound message, may be used as a left-inbound message or an up-inbound message by the comparison pipeline stage during the processing of the second tile.

Thus, methods and systems for performing stereo-matching using belief propagation have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A processor to perform stereo matching of a first image and a second image, comprising:
    a first pipeline stage including a first process element of the processor configured to generate data costs associated with a first tile selected from the first image, wherein the data costs are generated based on pixels in the first tile and corresponding pixels in the second image;
    a second pipeline stage including a second process element of the processor configured to generate disparity values associated with the first tile and an outbound message from the first tile to one of neighboring tiles in the first image, wherein the disparity values and the outbound message are generated based on the data costs and inbound messages from the neighboring tiles to the first tile; and
    a third pipeline stage including a third process element of the processor configured to store the disparity values and the outbound message in a memory, wherein the outbound message is used by the second pipeline stage as one of the inbound messages during processing of a second tile selected from the first image, wherein a first parallelism-degree of the first pipeline stage and a second parallelism-degree of the second pipeline stage are determined based on a number of inner iterations in processing the pixels of the first tile.

2. The processor as recited in claim 1, further comprising:
    a current image static random access memory (SRAM) coupled with the first pipeline stage, wherein the third pipeline stage is configured to load the pixels of the first tile into the current image SRAM, and the first pipeline stage is configured to retrieve the pixels of the first tile from the current image SRAM; and
    a reference image SRAM coupled with the first pipeline stage, wherein the third pipeline stage is configured to load the corresponding pixels in the second image into the reference image SRAM, and the first pipeline stage is configured to retrieve the corresponding pixels in the second image from the reference image SRAM.

3. The processor as recited in claim 1, further comprising:
    a cost static random access memory (SRAM) coupled with the first pipeline stage and the second pipeline stage, wherein the cost SRAM is configured to store the data costs generated by the first pipeline stage during a first pipeline cycle and used by the second pipeline stage during a second pipeline cycle subsequent to the first pipeline cycle.

4. The processor as recited in claim 1, further comprising:
    a down-and-right message static random access memory (SRAM) coupled with the second pipeline stage, wherein the down-and-right message SRAM is configured to store the outbound message when the processor processes the first image in a raster scan order, and the outbound message is a down-outbound message for the first tile to be used as an up-inbound message for a down-neighboring tile of the first tile, or a right-outbound message for the first tile to be used as a left-inbound message for a right-neighboring tile of the first tile.

5. The processor as recited in claim 1, further comprising:
    an up-and-left message static random access memory (SRAM) coupled with the second pipeline stage, wherein the up-and-left message SRAM is configured to store the outbound message when the processor processes the first image in an inverse-raster scan order, and the outbound message is an up-outbound message for the first tile to be used as a down-inbound message for an up-neighboring tile of the first tile, or a left-outbound message for the first tile to be used as a right-inbound message for a left-neighboring tile of the first tile.

6. The processor as recited in claim 1, wherein the second pipeline stage further comprising:
    a memory-read pipeline stage for loading from the memory a first inbound message and a second inbound message associated with the first tile;
    a comparison pipeline stage coupled with the memory-read pipeline stage for generating the outbound message based on the first inbound message, the second inbound message, the data costs, and a third inbound message; and
    a forwarding pipeline stage coupled with the comparison pipeline stage for forwarding the outbound message to the comparison pipeline stage as the third inbound message.

7. The processor as recited in claim 6, wherein the comparison pipeline stage is configured to generate a down-outbound message as the outbound message and the forwarding pipeline stage is configured to store the down-outbound message in a down-and-right message SRAM, wherein the down-outbound message for the first tile is used as an up-inbound message for a down-neighboring tile of the first tile in subsequent operations.

8. The processor as recited in claim 7, wherein the comparison pipeline stage does not generate an up-outbound message or a left-outbound message for the first tile.

9. A method to perform stereo matching of a first image and a second image using belief propagation (BP) by a video display system having a processor and a stereo-vision processor, comprising:
    generating, by a first pipeline stage supported by the stereo-vision processor, a first set of data costs based on pixels in a first tile selected from the first image, and corresponding pixels in the second image;
    generating, by a second pipeline stage supported by the stereo-vision processor, disparity values associated with the first tile and an outbound message from the first tile to one of neighboring tiles of the first tile in the first image, the disparity values and the outbound message being generated based on the first set of data costs and inbound messages from the neighboring tiles to the first tile; and storing, by a third pipeline stage supported by the stereo-vision processor, the disparity values and the outbound message, wherein the outbound message is used by the second pipeline stage as one of the inbound messages during processing of a second tile selected from the first image, wherein the second pipeline stage generates the disparity values based on the first set of data costs and inbound messages from the neighboring tiles to the first tile, and the inbound messages are outbound messages previously generated by the second pipeline stage.

10. The method as recited in claim 9, further comprising:
generating a depth map, by the processor, based on the disparity values; and
generating a multi-view image, by the processor, based on the depth map, the first image, and the second image.

11. The method as recited in claim 9, further comprising:
storing, by the first pipeline stage, the first set of data costs to a cost static random access memory (SRAM) during a first pipeline cycle;
generating, by the first pipeline stage, a second set of data costs based on a second tile selected from the first image during a second pipeline cycle subsequent to the first pipeline cycle; and
in-parallel to the generating of the second set of data costs by the first pipeline stage, accessing, by the second pipeline stage, the first set of data costs from the cost SRAM during the second pipeline cycle.

12. The method as recited in claim 9, wherein the generating the outbound message by the second pipeline stage comprises:

loading, by a memory-read pipeline stage supported by a process element of the stereo-vision processor, a first inbound message and a second inbound message from two of the neighboring tiles to the first tile;

generating, by a comparison pipeline stage supported by the process element of the stereo-vision processor, the outbound message based on the first inbound message, the second inbound message, the first set of data costs, and a third inbound message; and forwarding, by a forwarding pipeline stage supported by the process element of the stereo-vision processor, the outbound message to the comparison pipeline stage as the third inbound message.

13. The method as recited in claim 12, wherein the outbound message is used as the third inbound message for processing, by the comparison pipeline stage, a second tile selected from the first image.

14. The method as recited in claim 9, wherein the storing the disparity values and the outbound message comprises:
storing, by the third pipeline stage, the outbound message to a message static random access memory (SRAM) during a first pipeline cycle; and
retrieving, by the second pipeline stage, the outbound message as one of the inbound messages from the message SRAM during a second pipeline cycle subsequent to the first pipeline cycle.

15. The method as recited in claim 9, further comprises:
loading, by the third pipeline stage, a second tile selected from the first image into a current image static random access memory (SRAM), wherein the second tile is to be used by the first pipeline stage, and the first pipeline stage and the third pipeline stage share input/output cycles.

* * * * *